United States Patent
Yamashita et al.

(10) Patent No.: US 11,922,339 B2
(45) Date of Patent: Mar. 5, 2024

(54) SERVER, NON-TRANSITORY COMPUTER READABLE MEDIUM, AND TERMINAL APPARATUS

(71) Applicant: TOYOTA JIDOSHA KABUSHIKI KAISHA, Toyota (JP)

(72) Inventors: Taiki Yamashita, Toyota (JP); Daiki Kubo, Toyota (JP); Jake Morrow, Carrolton, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 17/465,294

(22) Filed: Sep. 2, 2021

(65) Prior Publication Data
US 2022/0076171 A1 Mar. 10, 2022

(30) Foreign Application Priority Data
Sep. 4, 2020 (JP) ................. 2020-149359

(51) Int. Cl.
*G06Q 10/02* (2012.01)
*B60W 40/08* (2012.01)
*G06Q 50/30* (2012.01)

(52) U.S. Cl.
CPC ............. *G06Q 10/02* (2013.01); *B60W 40/08* (2013.01); *G06Q 50/30* (2013.01);
(Continued)

(58) Field of Classification Search
CPC ....... G06Q 10/02; G06Q 50/30; B60W 40/08; B60W 2540/221; B60W 2554/80; B60W 2040/0872
(Continued)

(56) References Cited

U.S. PATENT DOCUMENTS 11,062,416 B1 * 7/2021 Jang ................... G06Q 30/016
11,393,062 B2 * 7/2022 Jacob Da Silva ...... H04W 4/90
(Continued)

FOREIGN PATENT DOCUMENTS

JP 2018-081576 A 5/2018
JP 2018-136880 A 8/2018
(Continued)

OTHER PUBLICATIONS

"Optimizing Locations for a vehicle Sharing System" Published by Infoscience (Year: 2012).*

*Primary Examiner* — Zeina Elchanti
(74) *Attorney, Agent, or Firm* — Dinsmore & Shohl LLP

(57) ABSTRACT

A server includes a communication interface and a controller. The controller receives a reservation request for a vehicle from a first user via the communication interface, determines an importance level of the reservation request, and generates first reservation information for a vehicle to be used by the first user, the first reservation information including the importance level. In a case in which there is no vehicle to assign to the first reservation information, the controller compares the importance level of the reservation request with importance levels of other reservation information that already exists, and assigns, to the first reservation information, a vehicle that has been assigned to second reservation information which is from among the other reservation information and includes an importance level lower than the importance level of the reservation request.

14 Claims, 5 Drawing Sheets

(52) U.S. Cl.
CPC .............. *B60W 2040/0872* (2013.01); *B60W 2540/221* (2020.02); *B60W 2554/80* (2020.02)

(58) Field of Classification Search
USPC .......................................................... 705/5
See application file for complete search history.

(56) References Cited

U.S. PATENT DOCUMENTS

| | | | |
|---|---|---|---|
| 2014/0275861 A1* | 9/2014 | Kroh | A61B 5/0031 600/302 |
| 2020/0410577 A1 | 12/2020 | Masuo et al. | |

FOREIGN PATENT DOCUMENTS

| | | |
|---|---|---|
| JP | 2019-197505 A | 11/2019 |
| WO | 2015/178158 A1 | 11/2015 |
| WO | 2019/176934 A1 | 9/2019 |

\* cited by examiner

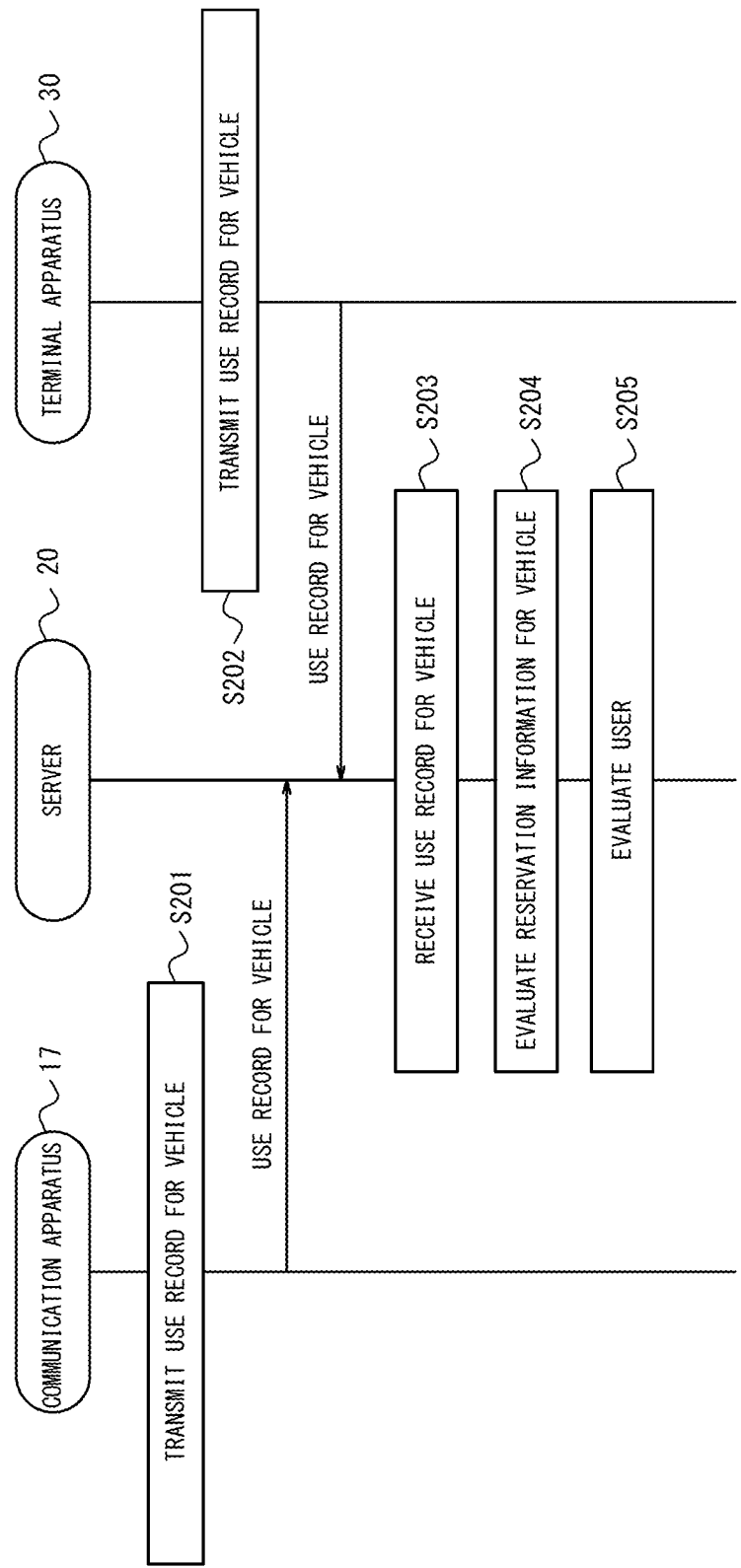

SERVER, NON-TRANSITORY COMPUTER READABLE MEDIUM, AND TERMINAL APPARATUS

CROSS-REFERENCE TO RELATED APPLICATION

This application claims priority to Japanese Patent Application No. 2020-149359, filed on Sep. 4, 2020, the entire contents of which are incorporated herein by reference.

TECHNICAL FIELD

The present disclosure relates to a server, a program, and a terminal apparatus.

BACKGROUND

Technology is known for improving convenience for a user in a car sharing service which provides vehicles that serve for shared use by a plurality of users. For example, Patent Literature (PTL) 1 discloses a vehicle reservation management system which prioritizes a reservation by a user who provides economic services, such as provision of parking lots, needed for sharing vehicles in a car sharing service.

CITATION LIST

Patent Literature

PTL 1: JP 2018-136880 A

SUMMARY

In recent years, it is desired to further improve convenience for a user in a car sharing service. For example, it is desired to prioritize and register a reservation for a vehicle having a higher importance level.

It would be helpful to provide a server, a program, and a terminal apparatus that improve convenience for a user in a car sharing service.

A server according to an embodiment of the present disclosure includes:
 a communication interface; and
 a controller configured to receive a reservation request for a vehicle from a first user via the communication interface, determine an importance level of the reservation request, and generate first reservation information for a vehicle to be used by the first user, the first reservation information including the importance level, wherein the controller is configured to:
  in a case in which there is no vehicle to assign to the first reservation information, compare the importance level of the reservation request with importance levels of other reservation information that already exists; and
  assign, to the first reservation information, a vehicle that has been assigned to second reservation information which is from among the other reservation information and includes an importance level lower than the importance level of the reservation request.

A program according to an embodiment of the present disclosure is configured to cause a computer to execute operations, the operations including:
 receiving a reservation request for a vehicle from a first user;
 determining an importance level of the reservation request; and
 generating first reservation information for a vehicle to be used by the first user, the first reservation information including the importance level,
 wherein the generating of the first reservation information includes:
  in a case in which there is no vehicle to assign to the first reservation information, comparing the importance level of the reservation request with importance levels of other reservation information that already exists; and
  assigning, to the first reservation information, a vehicle that has been assigned to second reservation information which is from among the other reservation information and includes an importance level lower than the importance level of the reservation request.

A terminal apparatus according to an embodiment of the present disclosure includes:
 a communication interface; and
 a controller configured to transmit, to a server via the communication interface, a reservation request for a vehicle, the reservation request including information to be used for determining an importance level of the reservation request, and cause the server to determine the importance level of the reservation request and generate reservation information for a vehicle, the reservation information including the importance level.

A server, a program, and a terminal apparatus according to an embodiment of the present disclosure improve convenience for a user in a car sharing service.

BRIEF DESCRIPTION OF THE DRAWINGS

In the accompanying drawings:

FIG. 6 is a flowchart illustrating second operations of the information processing system illustrated in FIG. 1.

DETAILED DESCRIPTION

Figure 1:
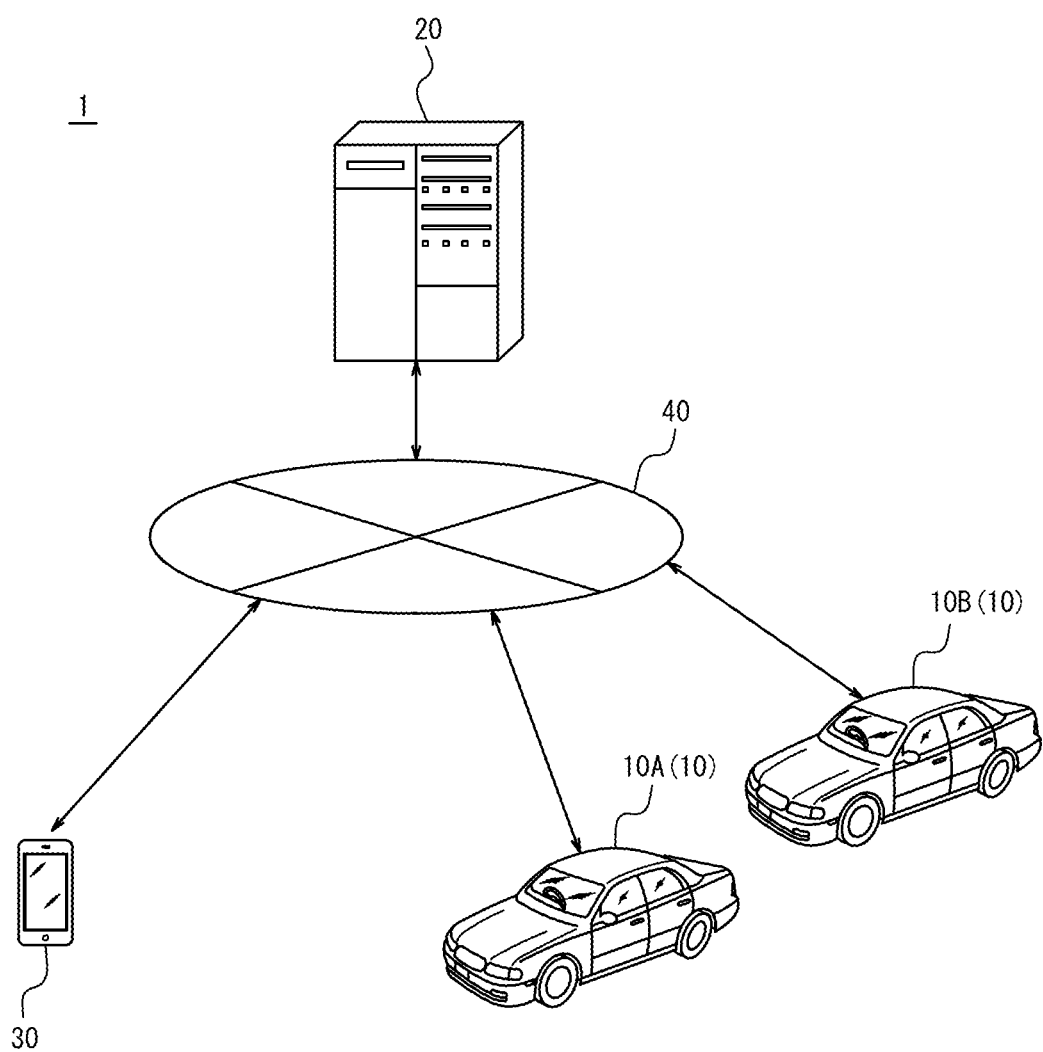
FIG. 1 is a diagram illustrating a schematic configuration of an information processing system according to an embodiment of the present disclosure.

Hereinafter, an embodiment of the present disclosure will be described.

In the drawings, the same or corresponding portions are denoted by the same reference numerals. In the descriptions of the present embodiment, detailed descriptions of the same or corresponding portions are omitted or simplified, as appropriate.

(Configuration of Information Processing System)

With reference to FIG. 1, an outline of the information processing system 1 according to the present embodiment will be described. FIG. 1 is a diagram illustrating a schematic configuration of the information processing system 1. The information processing system 1 includes vehicles 10, a server 20, and a terminal apparatus 30. FIG. 1 illustrates two of the vehicles 10, and one each of the server 20 and the terminal apparatus 30. However, the information processing system 1 may include any number of vehicles 10, servers 20, and terminal apparatuses 30.

The vehicles 10 are, for example, automobiles. However, the vehicles 10 are not limited to automobiles, and may be any vehicles such as motorcycles or bicycles. The vehicles 10 are, for example, shared cars that are to be shared by a plurality of users. In the present embodiment, the vehicles 10 include a first vehicle 10A and a second vehicle 10B. Hereinafter, the first vehicle 10A and the second vehicle 10B are collectively referred to simply as vehicles 10 unless distinguished otherwise. The vehicles 10 may each be driven by a driver, or the driving may be automated at any level. The level of automation is, for example, one of Level 1 to Level 5 in the level classification of the Society of Automotive Engineers (SAE).

The server 20 is configured by at least one computer. In the present embodiment, the server 20 will be described as being configured by a single computer. However, the server 20 may be configured by multiple computers, such as a cloud computing system.

Examples of the terminal apparatus 30 include a mobile phone, a smartphone, and a computer such as a personal computer. In the present disclosure, a computer is also referred to as an information processing apparatus. In the present embodiment, the terminal apparatus 30 is used, for example, by a user to use a vehicle 10.

The network 40 is any communication network through which the vehicles 10, the server 20, and the terminal apparatus 30 can communicate with one another. For example, the network 40 in the present embodiment may include an ad hoc network, a Metropolitan Area Network (MAN), a cellular network, a Wireless Personal Area Network (WPAN), a Public Switched Telephone Network (PSTN), a Terrestrial Wireless Network, an optical network, or another type of network or a combination of any of these.

The information processing system 1 is used, for example, in a car sharing service for sharing the vehicles 10.

In the information processing system 1, the server 20 manages reservation information for a plurality of the vehicles 10. The server 20 receives a reservation request for a vehicle 10 from the terminal apparatus 30 possessed by a first user. The server 20 determines an importance level of the received reservation request. For example, based on the reservation request, the server 20 may increase the importance level of the reservation request, in a case in which the first user should be prioritized to use a vehicle 10, such as in a case in which the first user goes to a hospital due to poor health, or in a case in which the first user who is a police officer heads to an accident site. The server 20 generates first reservation information for a vehicle 10 to be used by the first user, the first reservation information including the importance level. In generating the first reservation information, in a case in which there is no vehicle to assign to the first reservation information as all the vehicles 10 have already been reserved, the server 20 compares the importance level of the reservation request with importance levels of other reservation information that already exists. The server 20 assigns, to the first reservation information, a vehicle 10 that has been assigned to second reservation information which is from among the other reservation information and includes an importance level lower than the importance level of the reservation request. Thus, the information processing system 1 can improve convenience for a user in a car sharing service.

Next, the vehicles 10, the server 20, and the terminal apparatus 30 of the information processing system 1 will be described in detail.

(Configuration of Vehicle)

Figure 2:
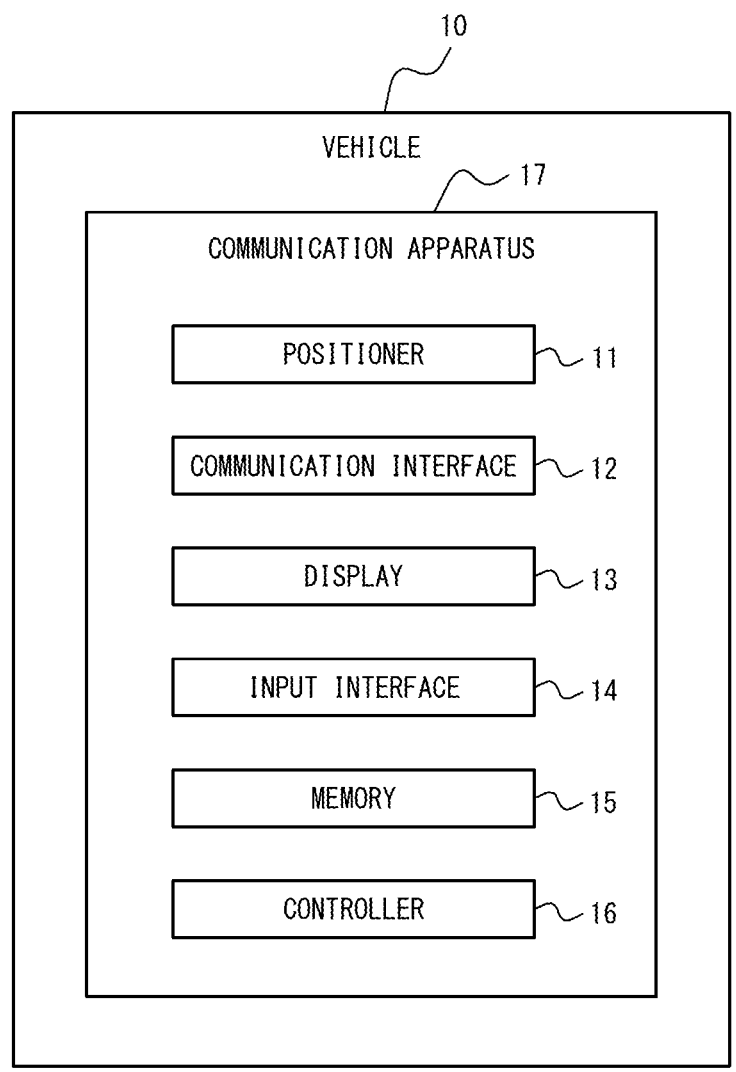
FIG. 2 is a block diagram illustrating a configuration of a vehicle according to an embodiment.

With reference to FIG. 2, a configuration of each of the vehicles 10 according to the present embodiment will be described. FIG. 2 is a block diagram illustrating the configuration of each of the vehicles 10. As illustrated in FIG. 2, each of the vehicles 10 includes a positioner 11, a communication interface 12, a display 13, an input interface 14, a memory 15, and a controller 16. The positioner 11, the communication interface 12, the display 13, the input interface 14, the memory 15, and the controller 16 are connected to one another via an in-vehicle network such as a Controller Area Network (CAN) network or dedicated lines so as to be able to communicate with one another by wire or wirelessly.

In the present embodiment, the communication apparatus 17 included in each of the vehicles 10 is described as having all the functions of the positioner 11, the communication interface 12, the display 13, the input interface 14, the memory 15, and the controller 16. The communication apparatus 17 is, for example, an in-vehicle apparatus such as an Electronic Control Unit (ECU), a car navigation apparatus, or an in-vehicle communication device. Alternatively, the communication apparatus 17 may be a mobile phone, a smartphone, or a computer such as a personal computer, installed on the vehicle 10. However, some of the functions described above may be provided by another in-vehicle device mounted in the vehicle 10 that are communicatively connected to the communication apparatus 17.

The positioner 11 measures the position of the corresponding vehicle 10, and generates positional information for the corresponding vehicle 10. The positional information for a vehicle 10 is, for example, coordinates such as two-dimensional coordinates or three-dimensional coordinates. The positioner 11 includes a receiver corresponding to a satellite positioning system for measuring the position of the corresponding vehicle 10 by navigation using the satellite positioning system. The satellite positioning system to which the receiver corresponds may be, for example, the Global Positioning System (GPS). Alternatively, the positioner 11 may include a sensor such as an acceleration sensor or a gyro sensor, for measuring the position of the corresponding vehicle 10 by autonomous navigation. A car navigation apparatus may function as the positioner 11.

The communication interface 12 includes a communication module for connecting to the network 40. The communication module is, for example, a communication module compliant with a mobile communication standard such as the 4th Generation (4G) standard or the 5th Generation (5G) standard. The communication module may be, for example, a communication module compliant with a standard such as a wired Local Area Network (LAN) or a wireless LAN. The communication module may be a communication module compliant with a short-range wireless communication standard such as Wi-Fi® (Wi-Fi is a registered trademark in Japan, other countries, or both), Bluetooth® (Bluetooth is a registered trademark in Japan, other countries, or both), or an infrared communication standard. In the present embodiment, the corresponding vehicle 10 is connected to the network 40 via the communication interface 12. This enables the corresponding vehicle 10 to communicate with the server 20 or the like.

The display 13 displays information in the form of an image, text, or the like. The display 13 includes, for example, a display device such as a monitor. A car navigation apparatus may function as the display 13.

The input interface 14 accepts input operations. The input interface 14 includes, for example, an input device such as a touch panel, a physical key, a camera, a microphone, or an IC card reader. A car navigation apparatus may function as the input interface 14.

The memory 15 is, for example, a semiconductor memory, a magnetic memory, an optical memory, or the like. The memory 15 functions as, for example, a main memory, an auxiliary memory, or a cache memory. The memory 15 stores any information used for operations of the corresponding vehicle 10. For example, the memory 15 stores a system program, an application program, embedded software, or the like. The information stored in the memory 15 may be updated with, for example, information acquired from the network 40 via the communication interface 12.

The controller 16 includes at least one processor. The processor may be, for example, a general purpose processor such as a Central Processing Unit (CPU), a dedicated processor dedicated to specific processing, or the like. The controller 16 is not limited to a processor and may include at least one dedicated circuit. The dedicated circuit may be, for example, a Field-Programmable Gate Array (FPGA) or an Application Specific Integrated Circuit (ASIC). The controller 16 controls the components such as the positioner 11, the communication interface 12, the display 13, the input interface 14, and the memory 15 that are described above in order to realize the functions of the communication apparatus 17, including the functions of the components.

The functions of the communication apparatus 17 are realized by executing a communication apparatus program according to the present embodiment on a processor of a computer. That is, the functions of the communication apparatus 17 are realized by software. The communication apparatus program is a program for causing a computer to execute the processing of steps included in operations of the communication apparatus 17, thereby enabling the computer to realize the functions corresponding to the processing of the steps. That is, the communication apparatus program is a program for causing the computer to function as the communication apparatus 17.

The program can be recorded on a non-transitory computer readable recording medium. The non-transitory computer readable recording medium is, for example, a magnetic recording device, an optical disc, a magneto-optical recording medium, or a semiconductor memory. The program is distributed, for example, by selling, transferring, or lending a portable recording medium such as a digital versatile disc (DVD) or a compact disc read only memory (CD-ROM) on which the program is recorded. Alternatively, the program may be distributed by storing the program in a storage of a predetermined server and transferring the program from the predetermined server to another computer. The program may also be provided as a program product.

The computer temporarily stores, for example, a program recorded on a portable recording medium or a program transferred from a predetermined server, in a memory. Then, the computer reads the program stored in the memory using a processor, and executes processing in accordance with the read program using the processor. The computer may read a program directly from the portable recording medium, and execute processes in accordance with the program. Each time a program is transferred from the predetermined server to the computer, the computer may execute processing in accordance with the received program in order. The processing may be executed through a so-called application service provider (ASP) type service which realizes functions merely by execution of instructions and acquisition of results, without transferring the program from the predetermined server to the computer. Programs encompass information that is to be used for processing by a computer and is thus equivalent to a program. For example, data that is not a direct command to a computer but has a property that regulates processing of the computer is "equivalent to a program" in this context.

(Configuration of Server)

Figure 3:
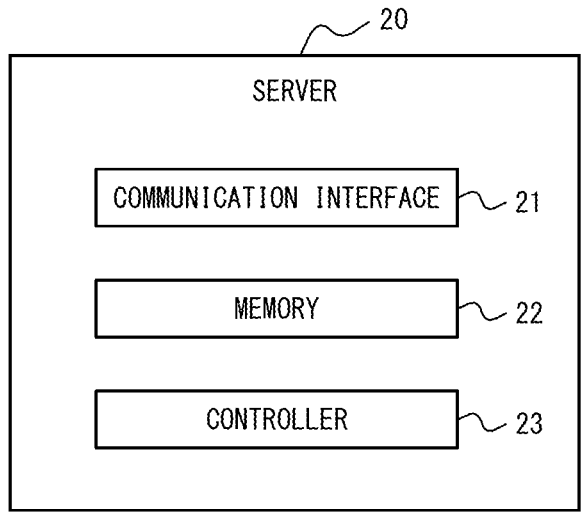
FIG. 3 is a block diagram illustrating a configuration of a server according to an embodiment.

With reference to FIG. 3, a configuration of the server 20 according to the present embodiment will be described. FIG. 3 is a block diagram illustrating the configuration of the server 20. As illustrated in the block diagram of FIG. 3, the server 20 includes a communication interface 21, a memory 22, and a controller 23. The communication interface 21, the memory 22, and the controller 23 are connected so as to be able to communicate with one another by wire or wirelessly.

The communication interface 21 includes a communication module for connecting to the network 40. The communication module is, for example, a communication module compliant with a mobile communication standard such as the 4G standard or the 5G standard. The communication module may be, for example, a communication module compliant with a standard such as a wired LAN standard or a wireless LAN standard. The communication module may be a communication module compliant with a short-range wireless communication standard such as Wi-Fi®, Bluetooth®, or an infrared communication standard. In the present embodiment, the server 20 is connected to the network 40 via the communication interface 21. This enables the server 20 to communicate with the vehicle 10 and the terminal apparatus 30.

The memory 22 is, for example, a semiconductor memory, a magnetic memory, an optical memory, or the like. The memory 22 functions as, for example, a main memory, an auxiliary memory, or a cache memory. The memory 22 stores any information used for operations of the server 20. For example, the memory 22 stores a system program, an application program, embedded software, a database, or the like. The information stored in the memory 22 may be updated with, for example, information acquired from the network 40 via the communication interface 21.

The controller 23 includes at least one processor. The processor may be, for example, a general purpose processor such as a CPU, a dedicated processor that is dedicated to specific processing, or the like. The controller 23 is not limited to a processor and may include at least one dedicated circuit. Examples of the dedicated circuit may include an FPGA and an ASIC. The controller 23 controls the components such as the communication interface 21 and the memory 22 that are described above in order to realize the functions of the server 20, including the functions of the components.

The functions of the server 20 are realized by executing a control program according to the present embodiment on a processor of a computer. That is, the functions of the server 20 are realized by software. The control program is a program for causing a computer to execute the processing of steps included in the operations of the server 20, thereby enabling the computer to realize the functions corresponding to the processing of the steps. That is, the control program is a program for causing a computer to function as the server 20.

(Configuration of Terminal Apparatus)

Figure 4:
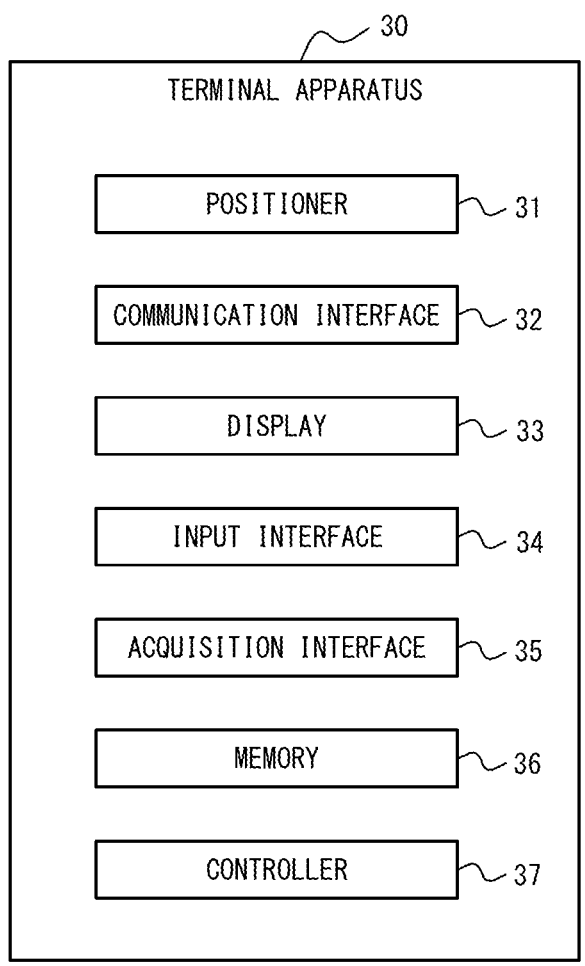
FIG. 4 is a block diagram illustrating a configuration of a terminal apparatus according to an embodiment.

With reference to FIG. 4, a configuration of the terminal apparatus 30 according to the present embodiment will be described. FIG. 4 is a block diagram illustrating the configuration of the terminal apparatus 30. As illustrated in the block diagram of FIG. 4, the terminal apparatus 30 includes a positioner 31, a communication interface 32, a display 33, an input interface 34, an acquisition interface 35, a memory 36, and a controller 37. The positioner 31, the communication interface 32, the display 33, the input interface 34, the acquisition interface 35, the memory 36, and the controller 37 are connected so as to be able to communicate with one another by wire or wirelessly.

The positioner 31 measures the position of the terminal apparatus 30 and generates positional information for the terminal apparatus 30. The positional information for the terminal apparatus 30 is, for example, coordinates such as two-dimensional coordinates or three-dimensional coordinates. The positioner 31 includes a receiver corresponding to a satellite positioning system for measuring the position of the terminal apparatus 30 by navigation using the satellite positioning system. The satellite positioning system which the receiver corresponds to may be, for example, the GPS. Alternatively, the positioner 31 may include a sensor, such as an acceleration sensor or a gyro sensor, to measure the position of the terminal apparatus 30 by autonomous navigation.

The communication interface 32 includes a communication module for connecting to the network 40. The communication module is, for example, a communication module compliant with a mobile communication standard such as the 4G standard or the 5G standard. The communication module may be, for example, a communication module compliant with a standard such as a wired LAN standard or a wireless LAN standard. The communication module may be a communication module compliant with a short-range wireless communication standard such as Wi-Fi®, Bluetooth®, or an infrared communication standard. In the present embodiment, the terminal apparatus 30 is connected to the network 40 via the communication interface 32. Thus, the terminal apparatus 30 can communicate with the server 20 or the like.

The display 33 displays information in the form of an image, text, or the like. The display 33 includes, for example, a display device such as a monitor.

The input interface 34 accepts input operations. The input interface 34 includes, for example, an input device such as a touch panel, a physical key, a camera, a microphone, or an IC card reader.

The acquisition interface 35 acquires information to be used for determining the importance level of a reservation request for the vehicle 10. For example, the acquisition interface 35 includes a sensor. The sensor may be, for example, a thermometer, a pulse meter, a sphygmomanometer, or an electrocardiograph. In this case, the acquisition interface 35 acquires biological information for a user, such as a body temperature, a pulse rate, a blood pressure value, or an electrocardiogram, using the sensor.

The acquisition interface 35 may include an input device. In this case, the acquisition interface 35 may accept information input by a user using the input device such as a touch panel. Alternatively, the acquisition interface 35 may accept an image captured by a user or sound generated by a user, using an input device such as a camera or a microphone. The input interface 34 described above may function as the acquisition interface 35.

The acquisition interface 35 may include a communication module. In this case, the acquisition interface 35 may communicate with another computer such as a wearable device worn by a user, and may receive biometric information for the user acquired by that computer. Alternatively, the acquisition interface 35 may read information about the user from the memory 36. The communication interface 32 described above may function as the acquisition interface 35.

The memory 36 is, for example, a semiconductor memory, a magnetic memory, an optical memory, or the like. The memory 36 functions as, for example, a main memory, an auxiliary memory, or a cache memory. The memory 36 stores any information used for operations of the terminal apparatus 30. For example, the memory 36 stores a system program, an application program, embedded software, a database, or the like. The information stored in the memory 36 may be updated with, for example, information acquired from the network 40 through the communication interface 32.

The controller 37 includes at least one processor. The processor may be, for example, a general purpose processor such as a CPU, a dedicated processor that is dedicated to specific processing, or the like. The controller 37 is not limited to a processor and may include at least one dedicated circuit. Examples of the dedicated circuit may include an FPGA and an ASIC. The controller 37 controls the components such as the communication interface 32, the display 33, the input interface 34, the acquisition interface 35, and the memory 36 that are described above in order to realize the functions of the terminal apparatus 30, including the functions of the components.

The functions of the terminal apparatus 30 are realized by executing a control program according to the present embodiment on a processor of a computer. That is, the functions of the terminal apparatus 30 are realized by software. The control program is a program for causing a computer to execute the processing of steps included in the operations of the terminal apparatus 30, thereby enabling the computer to realize the functions corresponding to the processing of the steps. That is, the control program is a program for causing the computer to function as the terminal apparatus 30.

(Operations of Information Processing System)

Figure 5:
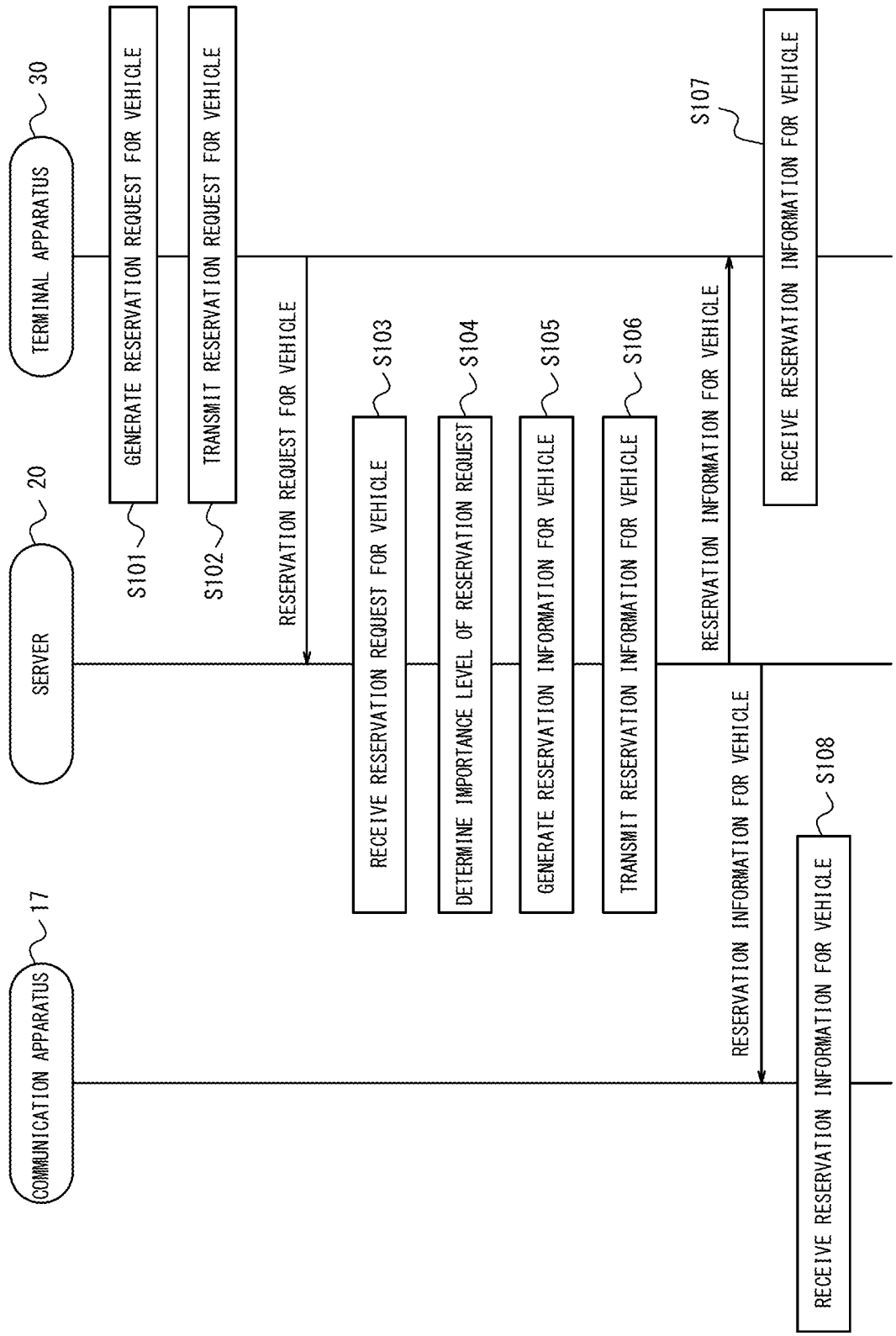
FIG. 5 is a flowchart illustrating first operations of the information processing system illustrated in FIG. 1.

With reference to FIGS. 5 and 6, operations of the information processing system 1 according to the present embodiment will be described. The information processing system 1 is used for managing reservation information for the vehicles 10 in a car sharing service. FIG. 5 is a flowchart illustrating first operations of the information processing system 1. FIG. 6 is a flowchart illustrating second operations of the information processing system 1.

As an example, it is assumed that a first user, who is one of the users of the vehicles 10, uses the terminal apparatus 30 to make a reservation for a vehicle 10. It is assumed that the server 20 manages the reservation information for a first vehicle 10A and a second vehicle 10B as the vehicles 10.

First, with reference to FIG. 5, a flow of processing in the information processing system 1 for the first user to make a reservation for a vehicle 10 from the terminal apparatus 30 will be described.

As illustrated in FIG. 5, in Step S101, the controller 37 of the terminal apparatus 30 generates a reservation request for a vehicle 10. The reservation request for a vehicle 10 includes information to be used for determining an importance level of the reservation request for a vehicle 10.

Specifically, the controller 37 of the terminal apparatus 30 generates a reservation request for a vehicle 10 in a case in which the controller 37 has accepted an instruction to generate a reservation request for a vehicle 10 via the input interface 34. The controller 37 controls the acquisition interface 35 to acquire information to be used for determining the importance level of the reservation request for a vehicle 10. The controller 37 generates a reservation request for a vehicle 10 including information to be used for determining the importance level of the reservation request for a vehicle 10. However, the controller 37 may generate a reservation request for a vehicle 10 without accepting any instruction via the input interface 34. The controller 37 may automatically generate a reservation request for a vehicle 10 in a case in which the acquisition interface 35 has acquired information to be used for determining the importance level of the reservation request for a vehicle 10, the information satisfying a predetermined condition. This enables the controller 37 to automatically generate a reservation request for a vehicle 10 in a case in which, for example, the acquisition interface 35 has acquired information indicating deterioration of the health condition of the user.

For example, information to be used for determining an importance level of the reservation request includes a type of a user to use a vehicle 10. The type of a user is, for example, an occupation of the user. This enables to determine the importance level of the reservation request to be higher in a case in which the occupation of the user is the one with high urgency such as doctor, police officer, or firefighter. The type of a user is not limited to an occupation, and may include information about the user, such as a disease the user is currently being treated for, a hospital being regularly visited by the user, the member rank of the user, or the age of the user.

The information to be used for determining the importance level of the reservation request may include an application of a vehicle 10. The application of a vehicle 10 is, for example, a destination of the vehicle 10. This enables to determine the importance level of the reservation request to be higher in a case in which the destination of a vehicle 10 is a place with high urgency such as a hospital, a police station, or an accident site. The application of a vehicle 10 is not limited to the destination, and may include information such as luggage to be carried on a vehicle 10.

The information to be used for determining the importance level of the reservation request may include information indicating a health condition of a user to use a vehicle 10. The information indicating the health condition of a user to use a vehicle 10 is, for example, biological information for the user, such as body temperature, pulse rate, blood pressure value, electrocardiogram, or the like. This enables to determine the importance level of the reservation request to be higher in a case in which the health condition of a user to use a vehicle 10 is poor. Alternatively, the information indicating the health condition of a user to use a vehicle 10 may be an image obtained by photographing the user or audio data obtained by recording the voice of the user. This enables to determine the importance level of the reservation request to be higher in a case in which it has been determined, based on the image or audio data, that the user is highly nervous.

The information to be used for the determination of the importance level of the reservation request is not limited to the above-described examples, and may include positional information for the user, the type, and the use start date and time, the use end date and time, the use period, or the like of a vehicle 10.

In Step S102, the controller 37 of the terminal apparatus 30 transmits, to the server 20 via the communication interface 32, the reservation request for a vehicle 10 including information to be used for determining the importance level of the reservation request for a vehicle 10. This enables the controller 37 to cause the server 20 to determine the importance level of the reservation request and generate reservation information for a vehicle 10 including the importance level, as will be described later.

In the present embodiment, a first user, who has become ill, operates the input interface 34 of the terminal apparatus 30 to make a reservation for a vehicle 10 by designating a hospital A as the destination in order to go to the hospital A which is regularly visited by the first user. The controller 37 of the terminal apparatus 30 controls the acquisition interface 35, and acquires the pulse rate of the first user. The controller 37 generates a reservation request for a vehicle 10 including the positional information for the first user, the positional information for the hospital A as the destination of a vehicle 10, and the pulse rate of the first user as the information indicating the health condition of the first user. The controller 37 transmits the reservation request for a vehicle 10 to the server 20 via the communication interface 32.

In Step S103, the controller 23 of the server 20 receives the reservation request for a vehicle 10 from the terminal apparatus 30 via the communication interface 21. The controller 23 stores the received reservation request for a vehicle 10 in the memory 22.

In Step S104, the controller 23 of the server 20 determines an importance level of the reservation request.

Specifically, the controller 23 of the server 20 determines the importance level of the reservation request based on the information to be used for determining the importance level of the reservation request, the information being included in the received reservation request for a vehicle 10. The importance level of the reservation request may be represented by, for example, a score of 0 to 100 such that a higher score is assigned to a more important reservation request. The controller 23 determines the importance level of the reservation request according to a type of the first user. For example, in a case in which the controller 23 has determined, based on the type of the first user, that the occupation of the first user is doctor, the controller 23 adds a predetermined score to increase the importance level of the reservation request. The controller 23 determines the importance level of the reservation request according to an application of a vehicle 10 intended by the first user. In a case in which the controller 23 has determined, based on the application of a vehicle 10 intended by the first user, that the destination of a vehicle 10 is a hospital, the controller 23 adds a predetermined score to increase the importance level of the reservation request. The controller 23 determines the importance level of the reservation request, according to a health condition of the first user. For example, in a case in which the controller 23 has determined, based on the information indicating the health condition of the first user, that the health condition of the first user is poor, the controller 23 adds a predetermined score to increase the importance level of the reservation request.

In determining the importance level of the reservation request, the controller 23 may correct the importance level based on past reservation information and use record for each user. For example, the controller 23 may store parameters for correcting the importance level for each user in the memory 22. In a case in which there are many discrepancies between the past reservation information for a certain user and the past use record for the user, the controller 23 may change the parameters for the user so that an importance level of a reservation request for a vehicle 10 from the user can be corrected to be low.

In Step S105, the controller 23 of the server 20 generates first reservation information for a vehicle 10 to be used by the first user, the first reservation information including the importance level.

Specifically, the controller 23 of the server 20 selects a vehicle 10 to assign to the first reservation information based on information included in the reservation request, such as the positional information for the first user or a use period. For example, the controller 23 determines, based on the information included in the reservation request, that there is a vehicle 10 to assign to the first reservation information, in a case in which a vehicle 10 for which no reservation information is registered in the use period is present within a predetermined distance range from the position of the first user. In a case in which there is a vehicle 10 to assign to the first reservation information, the controller 23 generates the first reservation information for the vehicle 10 to be used by the first user, the first reservation information including the determined importance level of the reservation request. The first reservation information for the vehicle 10 includes, for example, information for the user, information for the vehicle 10, a use period, and an importance level.

On the other hand, in a case in which there is no vehicle 10 to assign to the first reservation information, the controller 23 compares the determined importance level of the reservation request with importance levels of other reservation information that already exists. In a case in which second reservation information that includes an importance level lower than the importance level of the reservation request exists in the other reservation information, the controller 23 assigns, to the first reservation information, a vehicle 10 that has been assigned to the second reservation information, and generates the first reservation information. In a case in which the second reservation information includes a plurality of items, the controller 23 may assign a vehicle 10 that has been assigned to an item of the second reservation information, the item having an importance level lowest among the plurality of items of the second reservation information, to the first reservation information. Alternatively, in a case in which the second reservation information includes a plurality of items, the controller 23 may assign a vehicle 10 that has been assigned to one item in the plurality of items of the second reservation information, to the first reservation information, based on the position of the first user and the positions of vehicles 10 that have been assigned to respective items in the plurality of items of the second reservation information. For example, among the vehicles 10 that have been assigned to respective items in the plurality of items of the second reservation information, the controller 23 assigns, to the first reservation information, a vehicle 10 that is located at a position closest to the position of the first user, thereby reducing the distance that the first user needs to travel to use the vehicle 10.

In the present embodiment, the controller 23 of the server 20 determines the importance level of the reservation request received from the terminal apparatus 30. In a case in which it is determined, based on the information included in the reservation request, that the destination is the hospital A and the numerical value of the pulse rate for the first user is high, the controller 23 sets the importance level of the reservation request as high as 90. Next, the controller 23 confirms the reservation information for the first vehicle 10A and the second vehicle 10B in order to select a vehicle 10 to assign to the first reservation information. However, suppose that reservation information R1 with an importance level of 40 is set to the first vehicle 10A, and reservation information R2 with an importance level of 50 has already been registered for the second vehicle 10B. In this case, the controller 23 cancels the reservation information R1 having an importance level lowest among the reservation information R1 and R2. The controller 23 generates the first reservation information for enabling the first user to use the first vehicle 10A.

In Step S106, the controller 23 of the server 20 transmits the first reservation information for the vehicle 10 via the communication interface 21.

In Step S107, the controller 37 of the terminal apparatus 30 receives the first reservation information for the vehicle 10 via the communication interface 32. This enables, for example, the controller 37 to display the position of the vehicle 10 included in the first reservation information on a map on the display 33, and notify the first user that the reservation information for the vehicle 10 has been registered.

In Step S108, the controller 16 of the communication apparatus 17 via the communication interface 12 receives the first reservation information for the vehicle 10. This enables, for example, the communication apparatus 17 to set a keyless entry system based on the information for the first user included in the first reservation information, and enable the first user to use the vehicle 10.

Next, with reference to FIG. 6, a flow of processing in the information processing system 1 for evaluating a user based on a use record for a vehicle 10 assigned to the first reservation information will be described.

In Step S201, the controller 16 of the communication apparatus 17 transmits a use record for the vehicle 10 to the server 20 via the communication interface 12. The use record for the vehicle 10 is, for example, a travel route of the vehicle 10. In such a case, the controller 16 generates the travel route of the vehicle 10 based on the positional information for the vehicle 10 generated by the positioner 11. The controller 16 transmits the use record for the vehicle 10 including the generated travel route of the vehicle 10 to the server 20 via the communication interface 12. However, the use record for a vehicle 10 is not limited to the travel route of the vehicle 10, and may include information indicating that the vehicle 10 has arrived at the destination, such as an image obtained by photographing the outside of the vehicle 10 by the in-vehicle camera.

In Step S202, the controller 37 of the terminal apparatus 30 transmits the use record for the vehicle 10 to the server 20 via the communication interface 32. The use record for the vehicle 10 is, for example, a travel route of the terminal apparatus 30. The controller 37 of the terminal apparatus 30 generates the travel route of the terminal apparatus 30 based on the positional information for the terminal apparatus 30 generated by the positioner 31. The controller 16 transmits the use record for the vehicle 10 including the generated travel route of the terminal apparatus 30 to the server 20 via the communication interface 12. However, the use record for a vehicle 10 is not limited to the travel route of the terminal apparatus 30, and may include information indicating that the vehicle 10 arrived at the destination, such as an image taken at the destination after the vehicle 10 arrived at the destination or an image obtained by scanning a document issued at the destination.

In Step S203, the controller 23 of the server 20 receives the use record for the vehicle 10 via the communication interface 21. The controller 23 stores the received use record for the vehicle 10 in the memory 22.

In Step S204, the controller 23 of the server 20 evaluates the first reservation information for a vehicle 10. Specifically, the controller 23 determines whether the vehicle 10 has been used in accordance with the first reservation information, based on the use record for the vehicle 10 assigned to the first reservation information.

More specifically, the controller 23 of the server 20 determines that a vehicle 10 has been used in accordance with the first reservation information, in a case in which the destination included in the first reservation information is included in the travel route of the vehicle 10 or of the terminal apparatus 30 included in the use record for the vehicle 10 received from the communication apparatus 17 or the terminal apparatus 30. Alternatively, the controller 23 may determine that the vehicle 10 has been used in accordance with the first reservation information, in a case in which information indicating that the vehicle 10 arrived at the destination is included in the use record for the vehicle 10 received from the communication apparatus 17 or the terminal apparatus 30. The controller 23 stores the result of determination as to whether the vehicle 10 has been used in accordance with the first reservation information, in the memory 22 as the evaluation result for the first reservation information for the vehicle 10.

In Step S205, the controller 23 of the server 20 evaluates the first user based on the evaluation result for the first reservation information for the vehicle 10. Specifically, in a case in which it is determined that the vehicle 10 has not been used in accordance with the first reservation information, the controller 23 lowers an importance level of a reservation request for a vehicle 10 to be received next time or later from the first user. For example, the controller 23 may change the parameters for the user to be used for the determination of an importance level of a reservation request so that the importance level of the first reservation information for a vehicle 10 is corrected to be low.

In the present embodiment, the first user uses the first vehicle 10A to travel to the hospital A. The controller 16 of the communication apparatus 17 transmits the travel route along which the first vehicle 10A has traveled to the hospital A, to the server 20 via the communication interface 12. Further, the first user transmits, from the terminal apparatus 30 to the server 20, an image obtained by scanning a medical certificate issued by the hospital A after the first user was examined in the hospital A. The server 20 determines that the first vehicle 10A has been used in accordance with the first reservation information, because the position of the hospital A is included in the travel route of the first vehicle 10A received from the communication apparatus 17. Further, the server 20 determines that the first vehicle 10A has been used in accordance with the first reservation information, because an image obtained by scanning a medical certificate issued by the hospital A has been received from the terminal apparatus 30. Therefore, the server 20 does not change the parameters for the first user to be used to determine an importance level of the reservation request.

As described above, a server 20 according to the present embodiment includes a communication interface 21, and a controller 23 configured to receive reservation request for a vehicle 10 from a first user via the communication interface 21, determine an importance level of the reservation request, and generate first reservation information for a vehicle 10 to be used by the first user, the first reservation information including the importance level, in which in a case in which there is no vehicle to assign to the first reservation information, the controller 23 compares the importance level of the reservation request with importance levels of other reservation information that already exists, and assigns, to the first reservation information, a vehicle 10 that has been assigned to second reservation information which is from among the other reservation information and includes an importance level lower than the importance level of the reservation request. This configuration enables the server 20 to assign, even in a case in which all of the vehicles 10 have been reserved, a vehicle 10 that has been assigned to other reservation information that already exists, to the first user in a case in which it is determined that the reservation request for the first user is important. Therefore, the information processing system 1 can improve convenience for a user in a car sharing service.

In the server 20 according to the present embodiment, the importance level of the reservation request may be determined according to a type of the first user. This configuration enables the server 20 to more accurately evaluate the importance level of the reservation request from the first user by considering the type of the first user, such as an occupation of the first user.

In the server 20 according to the present embodiment, the importance level of the reservation request may be determined according to an application of a vehicle 10 intended by the first user. This configuration enables the server 20 to more accurately evaluate the importance level of the reservation request from the first user by considering the application of a vehicle 10 intended by the first user such as a destination of a vehicle 10.

In the server 20 according to the present embodiment, the importance level of the reservation request may be determined according to a health condition of the first user. This configuration enables the server 20 to more accurately evaluate the importance level of the reservation request from the first user by considering the health condition of the first user.

In the server 20 according to the present embodiment, in a case in which the second reservation information includes a plurality of items, the controller 23 can assign a vehicle 10 that has been assigned to an item of the second reservation information, the item having an importance level lowest among the plurality of items of the second reservation information, to the first reservation information. This configuration enables the server 20 to reduce influence of the cancellation of the second reservation information to be exerted on users other than the first user.

In the server 20 according to the present embodiment, in a case in which the second reservation information includes a plurality of items, the controller 23 can assign a vehicle 10 that has been assigned to one item in the plurality of items of the second reservation information, to the first reservation information, based on a position of the first user and positions of vehicles assigned to respective items in the plurality of items of the second reservation information. This configuration enables the server 20 to reduce the distance that the first user needs to travel to use the vehicle 10.

In the server 20 according to the present embodiment, the controller 23 can receive a use record for a vehicle 10 assigned to the first reservation information via the communication interface 21, and determine, based on the use record, whether the vehicle 10 has been used in accordance with the first reservation information. This configuration enables the server 20 to evaluate whether the importance level of the reservation request was properly determined in generating the first reservation information.

In the server 20 according to the present embodiment, in a case in which it is determined that the vehicle 10 has not been used in accordance with the first reservation information, the controller 23 can lower an importance level of a reservation request for a vehicle 10 to be received from the first user next time or later. This configuration enables the server 20 to assign a vehicle 10 to a more important reservation request.

A terminal apparatus 30 according to the present embodiment includes a communication interface 32, and a controller 37 configured to transmit, to a server 20 via the communication interface 32, a reservation request for a vehicle 10, the reservation request including information to be used for determining an importance level of the reservation request, and cause the server 20 to determine the importance level of the reservation request and generate reservation information for a vehicle 10 including the importance level. This configuration enables the terminal apparatus 30 to cause the server 20 to assign, even in a case in which all of the vehicles 10 have been reserved, a vehicle 10 that has been assigned to other reservation information that already exists, to the first user in a case in which it is determined that the reservation request for the first user is important. Therefore, the information processing system 1 can improve convenience for a user in a car sharing service.

In the terminal apparatus 30 according to the present embodiment, the information to be used for determining the importance level of the reservation request may include a type of a user to use the vehicle 10. This configuration enables the terminal apparatus 30 to cause the server 20 to determine the importance level in consideration of the type of the first user, such as an occupation of the first user.

In the terminal apparatus 30 according to the present embodiment, the information to be used for determining the importance level of the reservation request may include an application of the vehicle 10. This configuration enables the terminal apparatus 30 to cause the server 20 to determine the importance level in consideration of the application of the vehicle 10 intended by the first user, such as a destination of the vehicle 10.

In the terminal apparatus 30 according to the present embodiment, the information to be used for determining the importance level of the reservation request may include information indicating a health condition of a user to use a vehicle 10. This configuration enables the terminal apparatus 30 to cause the server 20 to determine the importance level in consideration of the health condition of the first user.

While the present disclosure has been described with reference to the drawings and examples, it should be noted that various modifications and revisions can be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

For example, in the aforementioned embodiment, all or some of the functions or processes described as the functions or processes of the server 20 may be realized as the functions or processes of the terminal apparatus 30. Specifically, a program in which processes for realizing functions of the server 20 according to the embodiment are written may be stored in a memory of the terminal apparatus 30 or the like, and the program can be read and executed by a processor of the terminal apparatus 30 or the like. For example, in the aforementioned embodiment, the process of determining the importance level of the reservation request is illustrated as the process to be executed by the server 20; however, the process may be executed by the terminal apparatus 30.

In addition, for example, a general purpose computer such as a smartphone may be configured to function as the communication apparatus 17 or the server 20 according to the aforementioned embodiment. Specifically, a program in which processes for realizing the functions of the communication apparatus 17 or the server 20 according to the embodiment are written may be stored in a memory of a computer, and the program may be read and executed by a processor of the computer. For example, in a case in which a general purpose computer is configured to function as the communication apparatus 17, such a configuration may be realized by installing a computer having the configuration and the functions of the communication apparatus 17 of any of the vehicles 10 described above in the corresponding vehicle 10.

The invention claimed is:

1. A server comprising: a communication interface; and a controller configured to: receive a reservation request for a vehicle from a first user via the communication interface, the reservation request including a destination; determine an importance level of the reservation request according to the destination included in the reservation request; generate first reservation information for a vehicle to be used by the first user, the first reservation information including the importance level and the destination; in a case in which there is no vehicle to assign to the first reservation information, compare the importance level of the reservation request with importance levels of other reservation information that already exists; assign, to the first reservation information, a vehicle that has been assigned to second reservation information which is from among the other reservation information and includes an importance level lower than the importance level of the reservation request; receive, via the communication interface, a use record for a vehicle assigned to the first reservation information, the use record including a travel route of the vehicle; determine whether the vehicle assigned to the first reservation information has been used in accordance with the first reservation information, based on whether the use record includes information indicating that the vehicle assigned to the first reservation information has arrived at the destination included in the first reservation information; and upon determining that the vehicle assigned to the first reservation information has not been used in accordance with the first reservation information, lower an importance level of a reservation request for a vehicle to be received next time or later from the first user.

2. The server according to claim 1, wherein the importance level of the reservation request is determined according to a type of the first user.

3. The server according to claim 1, wherein the importance level of the reservation request is determined according to an application of a vehicle intended by the first user.

4. The server according to claim 1, wherein the importance level of the reservation request is determined according to a health condition of the first user.

5. The server according to claim 1, wherein in a case in which the second reservation information includes a plurality of items, the controller assigns, to the first reservation information, a vehicle that has been assigned to an item of the second reservation information, the item having an importance level lowest among the plurality of items of the second reservation information.

6. The server according to claim 1, wherein in a case in which the second reservation information includes a plurality of items, the controller assigns, to the first reservation information, a vehicle that has been assigned to one item in the plurality of items of the second reservation information, based on a position of the first user and positions of vehicles that have been assigned to respective items in the plurality of items of the second reservation information.

7. The server according to claim 1, wherein the information indicating that the vehicle assigned to the first reservation information has arrived at the destination includes an image obtained by scanning a document issued at the destination.

8. A non-transitory computer readable medium storing a program configured to cause a computer to execute operations, the operations comprising: receiving a reservation request for a vehicle from a first user, the reservation request including a destination; determining an importance level of the reservation request according to the destination included in the reservation request; generating first reservation information for a vehicle to be used by the first user, the first reservation information including the importance level and the destination; wherein the generating of the first reservation information includes: in a case in which there is no vehicle to assign to the first reservation information, comparing the importance level of the reservation request with importance levels of other reservation information that already exists; and assigning, to the first reservation information, a vehicle that has been assigned to second reservation information which is from among the other reservation information and includes an importance level lower than the importance level of the reservation request, receiving a use record for a vehicle assigned to the first reservation information, the use record including a travel route of the vehicle; determining whether the vehicle assigned to the first reservation information has been used in accordance with the first reservation information, based on whether the use record includes information indicating that the vehicle assigned to the first reservation information has arrived at the destination included in the first reservation information; and upon determining that the vehicle assigned to the first reservation information has not been used in accordance with the first reservation information, lowering an importance level of a reservation request for a vehicle to be received next time or later from the first user.

9. The non-transitory computer readable medium according to claim 8, wherein the importance level of the reservation request is determined according to a type of the first user.

10. The non-transitory computer readable medium according to claim 8, wherein the importance level of the reservation request is determined according to an application of a vehicle intended by the first user.

11. The non-transitory computer readable medium according to claim 8, wherein the importance level of the reservation request is determined according to a health condition of the first user.

12. The non-transitory computer readable medium according to claim 8, wherein the generating of the first reservation information includes assigning, to the first reservation information, in a case in which the second reservation information includes a plurality of items, a vehicle that has been assigned to an item of the second reservation information, the item having an importance level lowest among the plurality of items of the second reservation information.

13. The non-transitory computer readable medium according to claim 8, wherein the generating of the first reservation information includes assigning, to the first reservation information, in a case in which the second reservation information includes a plurality of items, a vehicle that has been assigned to one item in the plurality of items of the second reservation information, based on a position of the first user and positions of vehicles that have been assigned to respective items in the plurality of items of the second reservation information.

14. An information processing system comprising:
a terminal apparatus configured to automatically generate a reservation request for
a vehicle upon acquiring information indicating deterioration of a health condition of
a first user; and
a server, wherein a controller of the server is configured to:
receive the reservation request from the terminal apparatus via a communication interface, the reservation request including a destination;
determine an importance level of the reservation request according to the destination included in the reservation request;
generate first reservation information for a vehicle to be used by the first user, the first reservation information including the importance level and the destination;
in a case in which there is no vehicle to assign to the first reservation information, compare the importance level of the reservation request with importance levels of other reservation information that already exists;
assign, to the first reservation information, a vehicle that has been assigned to second reservation information which is from among the other reservation information and includes an importance level lower than the importance level of the reservation request;
receive, via the communication interface, a use record for a vehicle assigned to the first reservation information, the use record including a travel route of the vehicle;
determine whether the vehicle assigned to the first reservation information has been used in accordance with the first reservation information, based on whether the use record includes information indicating that the vehicle assigned to the first reservation information has arrived at the destination included in the first reservation information; and
upon determining that the vehicle assigned to the first reservation information has not been used in accordance with the first reservation information, lower an importance level of a reservation request for a vehicle to be received next time or later from the first user.

* * * * *